United States Patent
Lifschitz

(12) 
(10) Patent No.: US 6,767,453 B2
(45) Date of Patent: Jul. 27, 2004

(54) PORTABLE WATER PURIFIER WITH ULTRAVIOLET LIGHT SOURCE

(76) Inventor: Eric L. Lifschitz, 537 Hyde, #15, San Francisco, CA (US) 94109

( * ) Notice: Subject to any disclaimer, the term of this patent is extended or adjusted under 35 U.S.C. 154(b) by 0 days.

(21) Appl. No.: 10/283,895

(22) Filed: Oct. 30, 2002

(65) Prior Publication Data

US 2003/0075490 A1 Apr. 24, 2003

Related U.S. Application Data

(63) Continuation of application No. 09/601,817, filed as application No. PCT/US99/18355 on Aug. 12, 1999, now Pat. No. 6,514,405.
(60) Provisional application No. 60/096,260, filed on Aug. 12, 1998.

(51) Int. Cl.$^7$ .................................................. C02F 1/32
(52) U.S. Cl. ........................ 210/85; 210/143; 210/192; 210/244; 422/186.3; 250/372; 250/432 R
(58) Field of Search .......................... 210/85, 143, 192, 210/244, 739, 745, 748; 250/370.07, 372, 432 R; 422/24, 186.3

(56) References Cited

U.S. PATENT DOCUMENTS

| | | | |
|---|---|---|---|
| 2,470,806 A | 5/1949 | Del Cueto | 219/43 |
| 4,144,152 A | 3/1979 | Kitchens | 204/158 R |
| 4,296,328 A | 10/1981 | Regan | 250/436 |
| 4,468,562 A * | 8/1984 | Wicnienski et al. | 250/372 |
| 4,762,613 A | 8/1988 | Snowball | 210/192 |
| 4,849,100 A | 7/1989 | Papandrea | 210/138 |
| 5,008,548 A * | 4/1991 | Gat | 250/372 |
| 5,436,115 A * | 7/1995 | Mullis | 430/338 |
| 6,042,720 A | 3/2000 | Reber et al. | 210/85 |
| 6,475,433 B2 * | 11/2002 | McGeorge et al. | 422/24 |
| 6,514,405 B1 | 2/2003 | Lifschitz | 210/143 |

FOREIGN PATENT DOCUMENTS

WO   WO-97/06108 A   2/1997

* cited by examiner

*Primary Examiner*—Matthew O. Savage

(57) ABSTRACT

A portable container is disclosed, provided a means for the purification of a fluid by ultraviolet radiation. The container houses the liquid and mates with the ultraviolet light source, which is powered by a battery attached thereto. Additionally, an ultraviolet light sensor is provided to shut off the ultraviolet light and notify the user when the water has received an adequate dose of ultraviolet radiation.

9 Claims, 1 Drawing Sheet

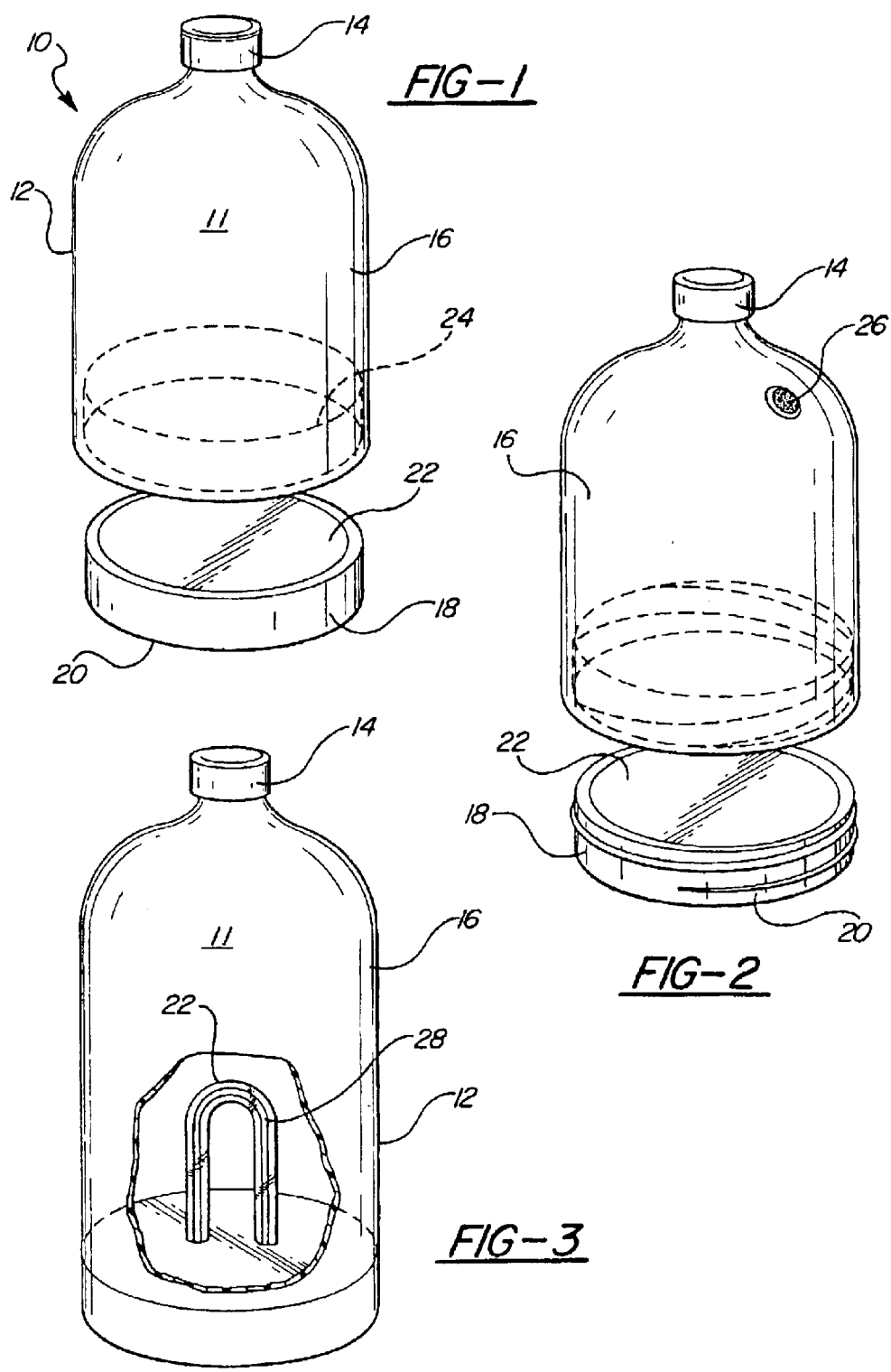

PORTABLE WATER PURIFIER WITH ULTRAVIOLET LIGHT SOURCE

REFERENCE TO RELATED APPLICATIONS

This application is a continuation of U.S. Ser. No. 09/601,817, filed Aug. 8, 2000, now U.S. Pat. No. 6,514,405, which is a U.S. National Phase Application of PCT/US99/18355, filed Aug. 12, 1999, which claims priority from U.S. Provisional Patent Application Ser. No. 60/096,260, filed Aug. 12, 1998. The entire contents of which are incorporated herein by reference.

The present invention relates generally to a water purification apparatus and, more particularly, to a portable water purifying and germicidal disinfecting system that utilizes ultraviolet radiation to prepare water for human consumption.

BACKGROUND OF THE INVENTION

Natural water supplies can be contaminated by any number of disease-carrying microorganisms from bacteria to protozoa to viruses. Consuming water that contains these organisms can lead to cramps, vomiting, diarrhea and even more serious medical problems. For water to be safe to drink, these microorganisms must be either rendered inactive or removed.

There exists a need for portable water treatment systems for providing water suitable for human consumption at remote locations. This need exists, for example, in rural areas where sophisticated water treatment facilities are not present, and in the aftermath of disasters such as earthquakes and hurricanes where the local water supply has been contaminated or disrupted. While enjoying recreational activities of extended periods of time, such as hiking or camping, there is a need for water to be purified in relatively small quantities. In these instances, some effective method of treating local water supplies becomes necessary.

Various devices have been developed to disinfect water using irradiation of infected water with certain frequencies of electromagnetic radiation such as those in the ultra-violet range. U.S. Pat. No. 4,849,100 issued to Papandrea discloses a portable water purifier which shuts off the water flow therethrough upon sensing that the ultraviolet light intensity has fallen below a predetermined level, in an attempt to ensure that all of the water is sufficiently purified. U.S. Pat. No. 4,755,292 issued to Merriam discloses a portable ultraviolet water sterilizer with ultraviolet reflective sidewalls, in an attempt to shield the user from harmful ultraviolet radiation and cause the water to be efficiently exposed to ultraviolet light.

The devices used heretofore have generally proved to be unsatisfactory for one or more reasons. Most irradiation water purification devices have been designed to remain stationary, having the water flow through as it is exposed to ultraviolet light, and thus require the use of a pump. Certain apparatuses of this type become coated with materials opaque to ultraviolet light after repeated use, and thus prevents satisfactory disinfection. Other devices do not provide a sufficient duration or intensity of ultraviolet light to fully disinfect the water. Many of the portable devices fail to provide a sufficient amount of ultraviolet light, as to do so might cause the ultraviolet bulb to overheat and become inoperable. Other devices have relied on the tendency of ultraviolet light to catalyze the formation of ozone from oxygen. However, these devices require a great deal of power to be consumed, and if portable, a bulky power source to be attached.

A portable water system must be compact, lightweight, and convenient to use. In addition to these requirements, a portable water purification system must be effective in purifying water to a suitable quality. It is also desirable that such a system not require the addition of chemicals and the like to be added to the water which either may lessen the quality of the treated water or require additional supplies.

High levels and prolonged exposure to ultraviolet light has been shown in recent years to cause various skin cancers, defects relating to human eyes, and the breakdown of human deoxyribonucleic acid. Therefore, it is desirable for the ultraviolet radiation utilized by the device to be prevented from escaping the device and effecting those who wish to benefit from the device's water purification.

A number of portable ultraviolet water purification devices have attempted to fulfill this need. U.S. Pat. No. 4,849,100 issued to Papandrea discloses a portable water purifier which shuts off the water flow therethrough upon sensing that the ultraviolet light intensity has fallen below a predetermined level, in an attempt to ensure that all of the water is sufficiently purified. U.S. Pat. No. 4,755,292 issued to Merriam discloses a portable ultraviolet water sterilizer with ultraviolet reflective sidewalls, in an attempt to shield the user from harmful ultraviolet radiation and cause the water to be efficiently exposed to ultraviolet light. However, these devices fall short of providing an efficient, durable, convenient, reliable portable purification device for drinking water. For example, the Merriam device is not shaped to be carried but is more of a bucket, the light source does not secure or seal to the container, the container does not seal, and there is no provision for cooling the light source. The Papandrea device requires water to flow therethrough making it poorly suited to portable use.

SUMMARY OF THE INVENTION

These problems of past devices have been overcome by the present invention, a portable water purification system. The portable water purification system of the present invention includes a container in which water is to be placed. Attached to the container is an ultraviolet light source which irradiates the water, the inside surfaces of the top and side portions of the container are coated with an ultraviolet reflective material. The entire container is made of a material opaque to ultraviolet light. A battery is provided in order to provide power to the ultraviolet light source. Additionally, a sensor is provided in order to determine when the water being purified has received an adequate dose of ultraviolet radiation. Upon this determination the operator of the purification device is notified and the ultraviolet light source of the present invention is automatically shut off.

BRIEF DESCRIPTION OF THE DRAWINGS

A better understanding of the present invention will be had upon reference to the following detailed description when read in conjunction with the accompanying drawings, wherein like reference characters refer to like parts throughout the several views, and in which:

FIG. 1 is an elevated view of a first preferred embodiment of the present invention;

FIG. 2 is an elevated view of a second preferred embodiment of the present invention; and FIG. 3 is an elevated exploded view of an alternative embodiment of the present invention.

DETAILED DESCRIPTION OF THE EMBODIMENT

First referring to FIG. 1, a portable liquid purification system according to the present invention is there shown.

The portable liquid purification system 10 includes a container surface 12, which generally defines the boundaries of a liquid container 11. Water, or another liquid intended for human consumption may be poured into the container 11. A lid 14 is then placed on the container 11 so as to seal the purification system 10 from being in liquid communication with its surroundings.

An ultraviolet light source 18 is removably secured to the bottom of the container surface 12 in order to provide the liquid inside the container 11 with ultraviolet radiation. The ultraviolet radiation is provided by an ultraviolet bulb (not shown in FIG. 1) of a type well known to those skilled in the art, an integral component of the ultraviolet light source 18. The ultraviolet bulb may be a deuterium lamp, or a high-pressure gas-filled arc lamp containing argon, xenon, or mercury, as is known in the art. The ultraviolet bulb may be powered by a battery, AC adapter, or solar cell (also not shown in FIG. 1).

A portable power source, either contained in the container or to which the container can be attached, for the activation of the irradiation system. Said power source may be of a rechargeable nature or of use by conventional batteries.

The ultraviolet bulb is contained in the ultraviolet light source 18 by a lens 22 and a source wall 20. The lens 22 is generally transparent with respect to ultraviolet light, and may be formed from quartz, fused silica, or a high tensile plastic resistant to discoloration and degradation. Preferably the container 11 does not have a bottom wall, but instead the source 18 seals off the bottom of the container when it is inserted into the recess 24. This provides the benefit of allowing heat from the source 18 to conduct directly to the liquid in the container, thereby cooling the source. The lack of a bottom wall also allows a user to thoroughly clean the inside of the container 11 when the source is removed, thereby removing buildup from the inner surface. As is clear to those of skill in the art, there are many ways in which the source 18 may be sealed to the bottom of the container 11. For example, it may snap into place and seal off the bottom. When the source 18 is removed, a cover may be provided for sealing the bottom of the container 11 so that water may be sterilized and stored without tying up the source. In this way, the source 18, may be used with multiple containers. Alternatively, the container may have a transparent-to-ultraviolet bottom wall so that the container 11 will hold a liquid when the source 18 is removed without the need for a cover. Either way, because ultraviolet radiation passes from the source, through the lens 22, and into the container 11, the ultraviolet radiation generated by the ultraviolet bulb is allowed to effect the liquid in the container 11.

The container surface 12, as well as the source wall 20, are substantially opaque to ultraviolet radiation. Additionally, the device will preferably shutoff, or not turn on, if the lid 14, also made of a material substantially opaque with respect to ultraviolet light, is not secured to the container surface 12. These characteristics protect the user from harmful ultraviolet radiation, which has been shown, in substantial doses, to deteriorate human health.

In order to increase efficiency, a reflective coating 16 is provided along the inner surface of container surface 12. The reflective coating 16 is substantially reflective with respect to ultraviolet light so as to cause the liquid in the container to absorb a maximum amount of the ultraviolet radiation emitted by the ultraviolet bulb. The reflective coating may be prescribed by industry standards and meet the requisites of being a material with a relatively high reflective index, a relatively cheap material and able to be manufactured in bulk quantities.

With reference now to FIG. 2, a second purification system 10 according to the present invention is there shown. This embodiment is similar to that illustrated in FIG. 1. However, this embodiment additionally includes an ultraviolet sensor 26. The ultraviolet sensor 26 determines when a sufficient amount of ultraviolet radiation has been emitted to the liquid for the liquid to be safe for consumption. Upon making such a determination, the ultraviolet sensor 26 preferably causes the ultraviolet bulb to stop emitting ultraviolet light. Additionally, or alternatively, the user is notified in some manner that the purification of the liquid has been completed. A sensor may be embedded into a wall of the container. Sensor may contain a transducer that converts radiant energy into an electrical signal, which can then be quantified for measurement. Sensor will be employed as a positive indicator that the level of irradiation within the container has met predetermined requirements. For this purpose, the sensor may include an indicator 27. This ultraviolet sensor 26 may be a photovoltaic cell, phototube, photomultiplier tube, or silicon diode, as is well known in the art. Obviously, the sensor 26 may be used with other embodiments of the present invention. As is known to those of skill in the art, the output of an ultraviolet light source 18 may degrade over time due to aging. Also, the amount of ultraviolet reaching the liquid may drop if the transparency of the lens 22 drops or sedimentation occurs. The sensor 26 allows a user to compensate for this effect and to make sure the liquid is ready to drink. As the light source 18 ages, the sensor will take longer to trigger, thereby increasing the useful life of the source 18. It also avoids over use of the light source 18, preventing premature battery discharge.

FIG. 2 also shows that the ultraviolet light source 18, as well as the bottom portion of the container surface 12 may be threaded so as to allow the ultraviolet light source 18 to be screwed into abutment with the container surface 12. Obviously, the ultraviolet light source 18 may also be removed in an opposite manner. This screw together arrangement is an alternative to the snap together arrangement of FIG. 1. The screw together arrangement works well for containers with circular cross sections, as shown, but would be unsuitable for a container with an elliptical cross section. Another preferred embodiment of the present invention has an elliptical cross section to make the container easier to wear on a user's belt. Other shapes are also possible.

Yet another embodiment of the present invention is illustrated in FIG. 3. In this embodiment, the ultraviolet bulb 28 protrudes into the container 11 where the liquid is housed. The ultraviolet bulb is surrounded by a lens 22 similar to that of the first two embodiments, of an appropriate shape.

The configuration displayed in FIG. 3, as well as similar configurations which fall in the scope of the present invention, allow for greater heat transfer between the ultraviolet bulb 28 and the liquid housed within the container 11. Ultraviolet bulbs of the type utilized in this invention may become very hot during operation and burn out. By providing a greater surface area of contact between the lens 22 and ultraviolet bulb 28, and the liquid, the ultraviolet bulb, will be allowed to cool more easily, and thus avoid burning out. Additionally, the container surface 12 may be formed from a substantially thermal conductive material to indirectly allow the ultraviolet bulb 28 to be cooled more efficiently.

Additionally, though not shown in the figures, a mechanical filter of a type well known to those skilled in the art may be attached to the container surface where the liquid is initially poured into the container 11. In this manner, particulate contaminants may be removed prior to irradiation by ultraviolet light.

Ultraviolet light can act as a catalyst in the formation of ozone from oxygen molecules, readily available in ambient air. Ozone, like ultraviolet light, is an effective water sterilizing agent. Therefore, by allowing air to come into contact with the liquid being purified by ultraviolet radiation, the sterilizing action of ozone may also be utilized.

Having described my invention, however, many modifications thereto will become apparent to those skilled in the art to which it pertains without deviation from the spirit of the invention as defined by the scope of the appended claims.

I claim:

1. A portable liquid purification system comprising:
   a container having a surface defining an interior volume, said container having a bottom with a recess defined therein and a top including a opening for introducing liquid into the interior volume;
   an ultraviolet light source comprising a housing having an upper surface that is at least partially transparent to ultraviolet light, said source configured to be inserted into said recess such that said source is disposed substantially within said recess, said source further comprising a power supply disposed within said housing and an ultraviolet light bulb disposed within said housing and selectively powered by said power supply, said source being selectively operable to project ultraviolet light through said upper surface and into said interior volume; and
   an ultraviolet light sensor disposed on said surface of said container such that a portion of the ultraviolet light passing through said interior volume is detected by said sensor, said sensor having an indicator operable to indicate when a predetermined quantity of ultraviolet light has been detected by said sensor such that the liquid in the container has received a predetermined dose of ultraviolet light.

2. The portable liquid purification system according to claim 1, wherein said source is disk shaped and said upper surface is generally flat.

3. The portable liquid purification system according to claim 1, wherein said container is generally cylindrical and said bottom comprises an end of said cylindrical container and has a diameter, said recess extending across substantially the entire diameter of said bottom.

4. The portable liquid purification system according to claim 1, wherein said recess is open to said interior volume such that said upper surface of said source is in contact with said interior volume and said source seals said bottom of said container.

5. The portable liquid purification system according to claim 1, further comprising a rigid, liquid impermeable material reflective of ultraviolet light lining the inside of said container.

6. The portable liquid purification system according to claim 1, said container being formed from a material generally opaque to ultraviolet light.

7. The portable liquid purification system according to claim 1, wherein said upper surface of said housing comprises a transparent lens, the remainder of said housing being generally opaque to ultraviolet light.

8. The portable liquid purification system according to claim 1, wherein said recess includes threads and said housing includes threads such that said housing threadingly engages said recess.

9. The portable liquid purification system of claim 1, wherein said ultraviolet light source extends into said container such that said source is immersed in liquid during operation and is in thermal contact with the liquid.

* * * * *